No. 729,622. PATENTED JUNE 2, 1903.
G. H. MARKER.
HUB ATTACHING DEVICE.
APPLICATION FILED NOV. 18, 1902.
NO MODEL.
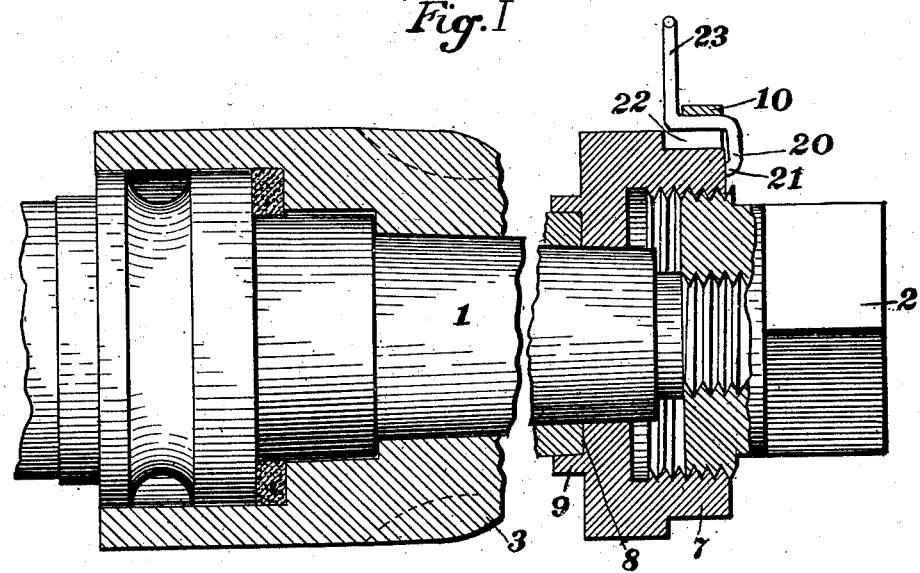
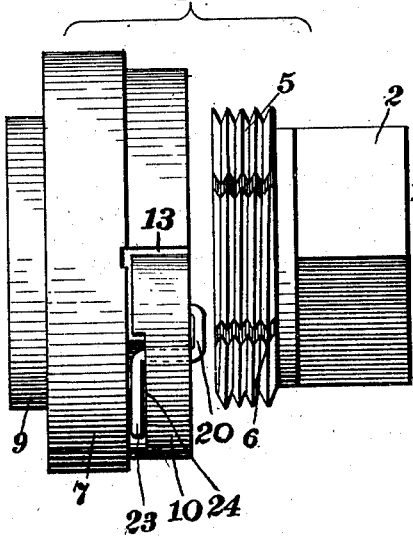
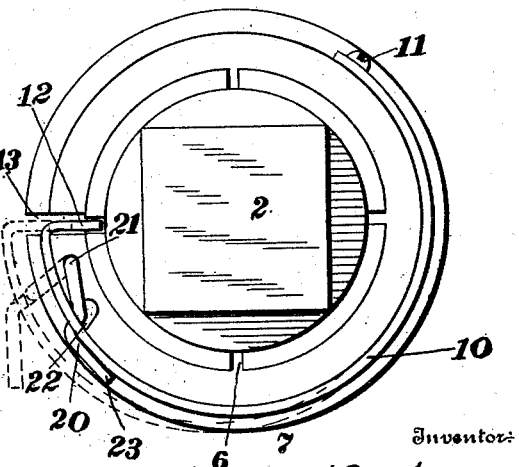

No. 729,622. Patented June 2, 1903.

UNITED STATES PATENT OFFICE.

GEORGE H. MARKER, OF SPOKANE, WASHINGTON.

HUB-ATTACHING DEVICE.

SPECIFICATION forming part of Letters Patent No. 729,622, dated June 2, 1903.

Application filed November 13, 1902. Serial No. 131,852. (No model.)

*To all whom it may concern:*

Be it known that I, GEORGE H. MARKER, a citizen of the United States, and a resident of Spokane, Spokane county, State of Washington, have invented certain new and useful Improvements in Hub-Attaching Devices; and my preferred manner of carrying out the invention is set forth in the following full, clear, and exact description, terminating with claims particularly specifying the novelty.

This invention relates to cap-nuts forming a part of a hub-attaching device; and the object of the same is to render the nut adjustable at the point where it bears against the skein.

To this end the invention consists in the adjustable attachment of a washer to the nut and in the means employed for permitting adjustment of the washer and for locking it in its adjusted position, all as described below and as shown in the drawings, wherein—

Figure I is a longitudinal section through the metal portion of an axle-bearing embodying this invention. Fig. II is a plan view of the nut and washer detached and slightly separated. Fig. III is an outer end elevation of the nut and washer, showing in dotted lines how the catch is raised.

In the drawings, 1 is the usual axle onto whose outer end is screwed a cap-nut 2—that is to say, a nut which is closed at its outer end to prevent the admission of dirt and there made angular for the reception of a wrench.

3 is the usual skein which surrounds the spindle of the axle and which is driven into the wooden portion of the hub in a well-known manner. Heretofore the inner end of the nut bore against the outer end of the skein and when one or both of these faces became worn rattling resulted unless a washer was interposed, new parts were substituted, or the nut was screwed farther home on the spindle, which was not always possible. The present invention contemplates the employment of means whereby the bearing of the inner end of the nut against the outer end of the skein may be adjusted in a better manner.

The nut in my invention is made circular at its inner end and is threaded exteriorly, as at 5, while a number of longitudinal grooves 6 are cut across these threads.

7 is a washer interiorly threaded at its outer end to engage the thread 6, while its inner end is reduced, as at 8, so as to bear against the outer end of the skein, and may have a flange 9, projecting a short distance over and surrounding said outer end of the skein.

10 is a spring-catch secured at one end, as by a screw 11, to the exterior of the washer, extending partially around the same and having its tip 12 bent inward and normally projected inward through a slot or opening 13 in the washer, whereby this tip may spring into one of the grooves 6 to latch the washer to the nut after it has been adjusted by screwing it thereon.

As thus far described after the parts have become worn, as above explained, it is only necessary to spring the tip of the latch outward and turn the washer upon the nut to take up the looseness and then permit the latch to reëngage one of the grooves in the nut.

While any suitable tool or means may be employed for springing the latch outward, I prefer the device herein shown, which consists of a lever 20, composed of a bent wire pivoted at one end at 21 in the inner end of the washer, its body passing then along the latch near the tip of the latter and lying normally in a groove 22 in the washer, and its inner end 23 lying normally under the rear edge of the latch, which may be cut away slightly, as at 24, to give space for this rear end or handle. The thumb-nail can be inserted beneath the handle and the latter raised, as shown in dotted lines in Fig. III, when the body portion of this lever will lift the tip of the latch out of the groove 6 in the nut. The parts are then adjusted, as above described, after which a release of the lever causes the latch to spring back to place, and with it the lever is carried back to its normal position.

What is claimed as new is—

1. In a hub-attaching device, the combination with the axle-spindle, the skein, and the nut screwed onto the spindle; of a washer screwed around the nut and resting against the end of the skein, and a radially-moving spring-pressed latch carried by the washer with its tip normally engaging the nut to lock these parts after they have been relatively adjusted.

2. In a hub-attaching device, the combination with the axle-spindle, the skein, and the nut screwed onto the spindle, the nut being exteriorly threaded at its inner end and provided with longitudinal grooves through said threads; of a washer interiorly threaded and screwed onto the nut against the end of the skein, the washer having a slot, and a spring-pressed latch mounted on the washer and normally projected inward through said slot to engage one of the grooves in the nut.

3. In a hub-attaching device, the combination with the axle-spindle, the skein, and the nut screwed onto the spindle, the nut being exteriorly threaded at its inner end and provided with longitudinal grooves through said threads; of a washer interiorly threaded and screwed onto the nut against the end of the skein, the washer having a slot, a spring-pressed latch mounted on the washer and normally projected inward through said slot to engage one of the grooves in the nut and means for lifting the tip of the latch out of said groove.

4. The combination with a cap-nut having an angular portion for a wrench, and a circular portion exteriorly threaded and provided with longitudinal grooves across its threads; of a washer having its outer end interiorly threaded and screwed around the nut, and its inner end reduced to less diameter than its threaded portion, and a latch carried by the washer and extending radially inward through its outer end to engage one of said grooves, as and for the purpose set forth.

5. The combination with a nut having an angular portion for a wrench, and threaded both interiorly and exteriorly and provided with longitudinal grooves across its exterior threads; of a washer having its outer end interiorly threaded and screwed around the nut, a latch carried by the washer and extending radially inward through its outer end to engage one of said grooves, and a pivoted lever carried by the washer for disengaging said latch from the groove when desired, substantially as described.

6. The combination with a nut having an angular portion for a wrench, and a circular portion exteriorly threaded and provided with longitudinal grooves across its threads; of a washer interiorly threaded and screwed around the nut, a latch consisting of a spring attached at one extremity to the washer and having at its other extremity a tip projected normally inward through the washer to engage one of said grooves, and a lever consisting of a bent wire pivoted at one extremity in the inner end of the washer, its body extending thence beneath the latch, and its other extremity lying along the inner edge of the latch, substantially as described.

In testimony whereof I have hereunto subscribed my signature this the 11th day of November, A. D. 1902.

GEORGE H. MARKER.

Witnesses:
BURTON J. ONSTINE,
JOHN H. ROCHE,
J. B. ONSTINE.